UNITED STATES PATENT OFFICE.

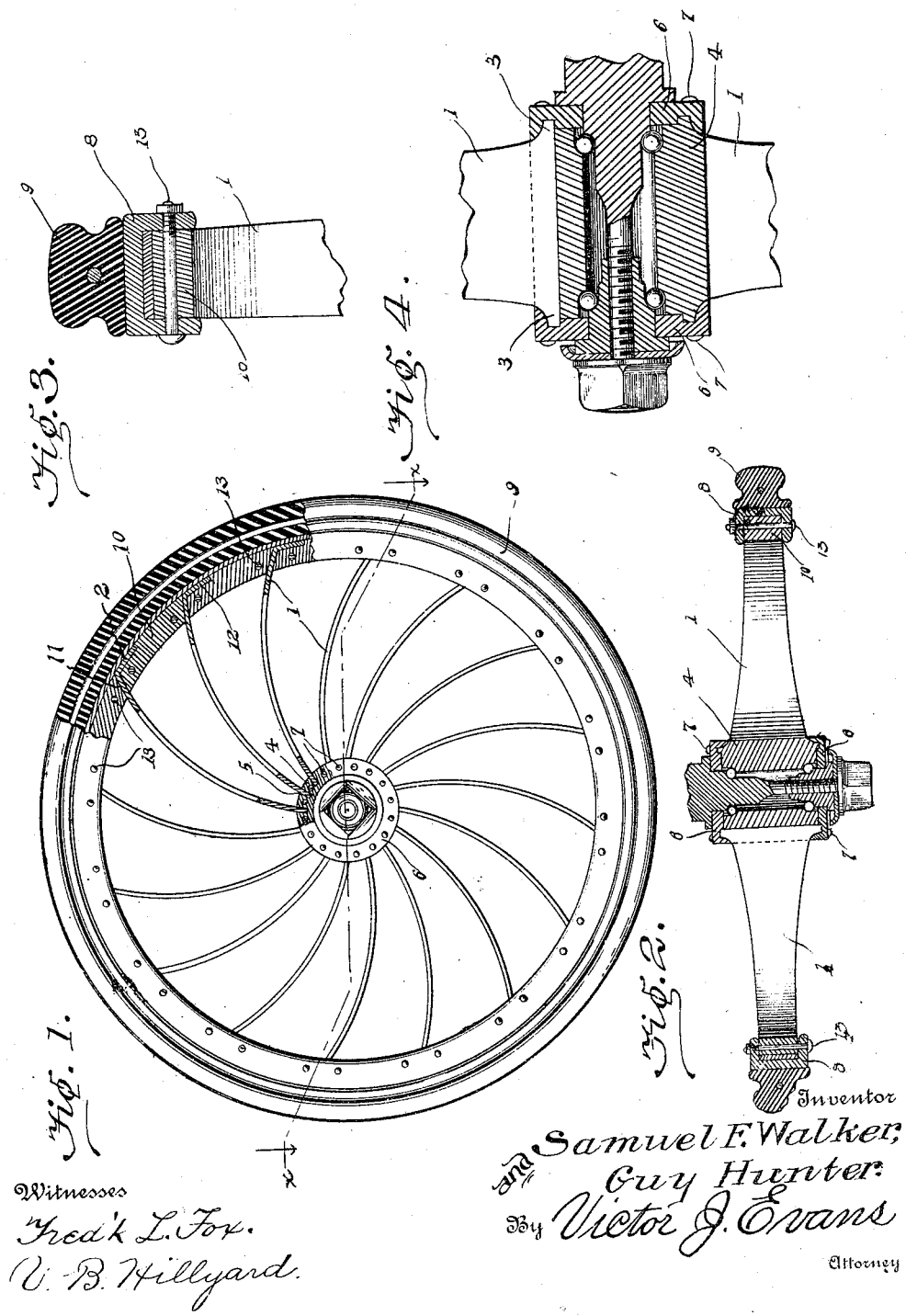

SAMUEL F. WALKER AND GUY HUNTER, OF BOZEMAN, MONTANA.

SPRING-WHEEL.

1,014,541.  Specification of Letters Patent.  Patented Jan. 9, 1912.

Application filed April 15, 1910. Serial No. 555,610.

*To all whom it may concern:*

Be it known that we, SAMUEL F. WALKER and GUY HUNTER, citizens of the United States, residing at Bozeman, in the county of Gallatin and State of Montana, have invented new and useful Improvements in Spring-Wheels, of which the following is a specification.

The present invention contemplates the provision of a vehicle wheel of novel structure involving spring spokes of such construction and arrangement as to admit of the rim of the wheel yielding so as to absorb shock and vibration, with the result that the wear and tear upon the vehicle is reduced and the comfort of the passenger or person occupying the vehicle assured.

The invention consists primarily of spring spokes of peculiar formation and novel connecting means for uniting the spokes both to the hub and to the rim, the parts being designed with a view to durability and ease of replacement should any of the elements become unfitted for further effective service.

The invention consists of the novel features, details of construction and combination of parts, which hereinafter will be more particularly set forth, illustrated in the accompanying drawing, and pointed out in the appended claim.

Referring to the drawing, forming a part of the application, Figure 1 is a view in elevation of a vehicle wheel embodying the invention. Fig. 2 is a detail cross section on the line *x*—*x* of Fig. 1. Fig. 3 is a sectional detail of the rim portion of the wheel on a larger scale. Fig. 4 is a sectional view of the hub on a larger scale.

Corresponding and like parts are referred to in the following description, and indicated in all the views of the drawing, by the same reference characters.

The wheel while adapted for general use is designed most especially for automobiles and mechanically propelled vehicles, since it neutralizes shock and vibration and reduces the wear upon the working parts to the smallest amount possible.

The wheel in its general construction comprises a hub, a rim and spring spokes connecting the hub and rim. The spring spokes 1 are flat and tapered and curved in their length, the outer ends of the spokes being bent, as indicated at 2, and the inner ends being widened and formed upon opposite sides with lateral projections 3. This construction of the spokes provides an extended base as well as securing means for fastening the spokes to the hub. By having the spokes curved throughout their length they are adapted to yield when subjected to vertical or endwise pressure and by having the spokes tapered throughout their width they present a practically uniform strength and resistance to end thrust. The bent ends 2 enable the outer ends of the spokes to obtain ample bearing against the rim so as to prevent cutting or becoming embedded therein, while at the same time providing attaching means for securing the spokes to the rim.

The hub 4 is provided upon its exterior with transverse grooves 5 in which the inner ends of the spokes 1 are fitted. Cap rings 6 fitted to the ends of the hub have their rims constructed to engage over the lateral projections 3 of the spokes so as to confine the latter in the grooves or seats 5. Bolts 7 pass through registering openings formed in the cap rings 6 and in the hub 4 and serve to hold the said cap rings in place. The bolts 7 are located intermediate of the spokes. Ball bearings are provided at opposite ends of the hub and may be of any construction.

The rim of the wheel comprises a U-shaped ring 8 and a tire 9, which latter may be of any material. The U-shaped ring 8 receives the outer bent ends 2 of the spokes, which are secured therein by means of filling pieces 10, which preferably consist of wood or aluminum. The filling pieces 10 are of uniform length and extend across the spaces formed between the outer ends of adjacent spokes. One end of each filling piece is inclined, as shown at 11, to engage the straight side of the spoke, whereas the opposite end is cut away, as indicated at 12, to provide clearance for the bent end 2 of the spokes. Bolts 13 pass through transversely alined openings formed in the side flanges of the ring 8 and through openings formed in the end portions of the filling pieces. By having one end 12 of each of the filling pieces engage under the bent end 2 of a spoke and the inclined end 11 of the adjacent filling piece engage the straight side of the spoke the latter is confined at its outer end between the ends of adjacent filling pieces and by locating the bolts or fastenings 13 near the ends of the filling pieces the connection of the parts is made more secure.

In the event of it being necessary to replace any of the spokes the cap rings 6 may be easily moved outward and two of the filling pieces 10 adjacent the spoke to be replaced may be quickly removed so that the spoke to be replaced may be easily and quickly removed and substitution made.

From the foregoing description, taken in connection with the accompanying drawing, the advantages of the construction and of the method of operation will be readily apparent to those skilled in the art to which the invention appertains, and while we have described the principle of operation of the invention, together with the device which we now consider to be the embodiment thereof, we desire to have it understood that the device shown is merely illustrative, and that such changes may be made when desired as are within the scope of the claim appended hereto.

Having thus described the invention what is claimed as new, is:—

In a vehicle wheel, the combination of a rim of substantially U form, spokes curved throughout their length and having the outer terminal portions bent at obtuse angles and fitting against the inner side of the tread portion of the rim, filling pieces of like formation arranged in the space of the rim and between the outer ends of the spokes, the ends of the filling pieces being inclined to abut against the inclined ends of the spokes, one end of each filling piece being cut away to receive the bent end of a spoke which is retained in place by the opposing end of the adjacent filling piece, and fastenings passing through the side flanges of the rim and the filling pieces to secure them and the spokes together.

In testimony whereof we affix our signatures in presence of two witnesses.

SAMUEL F. WALKER.
GUY HUNTER.

Witnesses:
WM. HOCKER,
WM. CUSHING.